Patented June 5, 1934

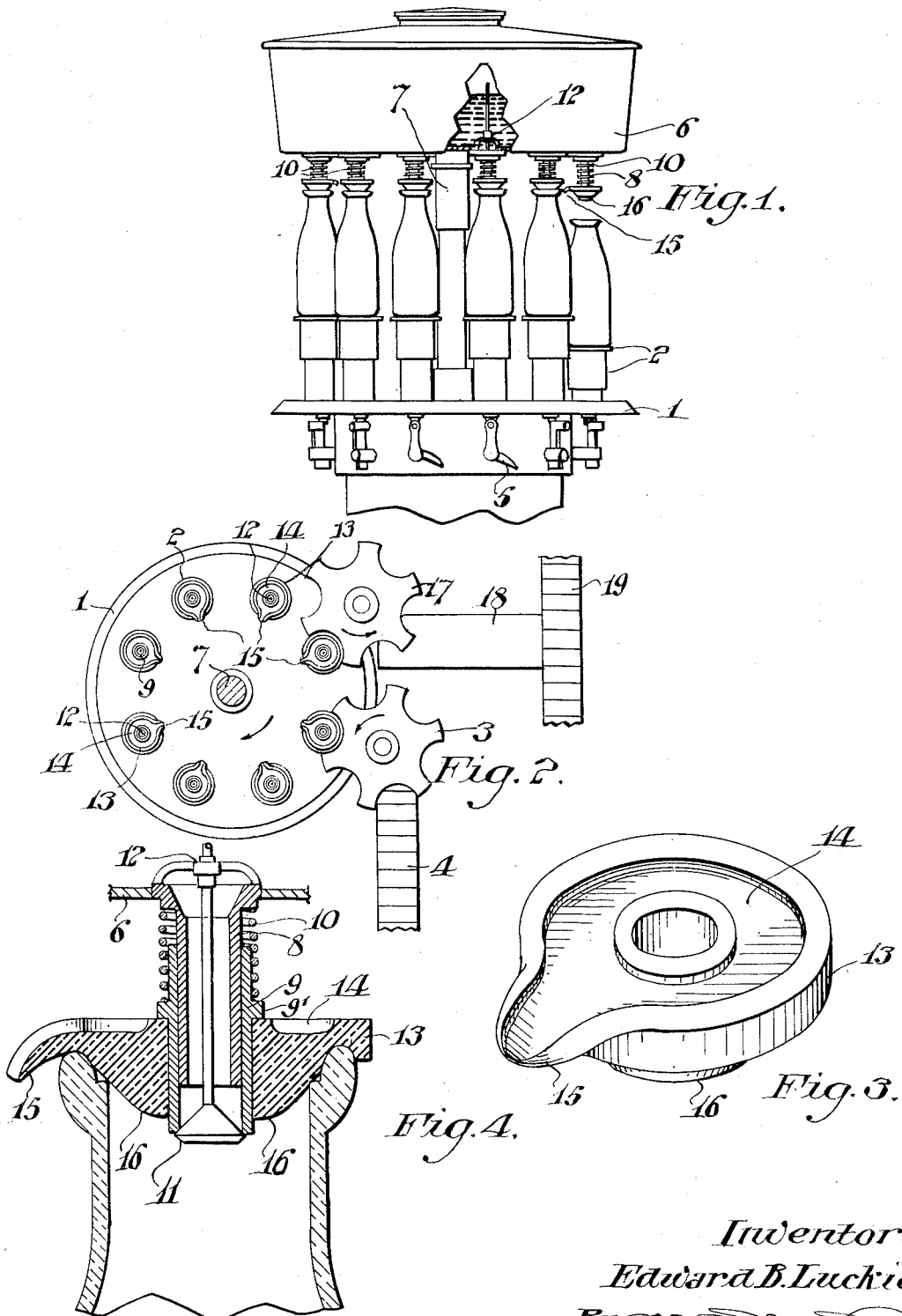

1,961,563

UNITED STATES PATENT OFFICE 1,961,563

BOTTLE FILLER WASHER

Edward B. Luckie, Chester, Pa., assignor to Abbotts Dairies, Inc., Philadelphia, Pa., a corporation of Maryland Application November 24, 1930, Serial No. 497,684

7 Claims. (Cl. 226—119)

My invention is designed to provide means for preventing the contamination of the contents of containers, such as milk bottles, by condensation and leakage dripping thereinto during the movement of the container under or from the filling tube or spout.

The low temperature of milk or other liquid in a supply reservoir provided with one or more bottle filling spouts or tubes results in the condensation of atmospheric moisture on the exterior surface of the supply tank and spouts which drips down the spout and into the mouth of the bottle moving under or from the filling spout. Moreover when filling spouts are used controlled by pressure from the bottle being filled, there is danger of leakage of milk through the joints of the spout and such leakage runs down the exterior surface of the spout and drips into the mouth of the bottle moving under or from the filling spout.

In accordance with my invention, such condensate and leakage is collected immediately above the spout orifice and discharged through an outlet discharging beyond the zone of the mouth of a bottle moving under or from the bottle filling spout. The condensate and leakage is preferably collected in a groove or channel formed in the top surface of an elastic disk or washer sleeved on the filling spout adjacent to the outlet therefrom and against which the rim of the bottle mouth is pressed to elevate the spout and permit discharge therefrom. An orifice or spout discharges the accumulated liquid from the channel and the disk or washer is so positioned that a bottle moving under or from the bottle filling spout does not pass under effluent from the collecting channel. My improvements are particularly advantageous in conjunction with rotary bottle filling machines having means for automatically moving a series of bottles in sequence upon a series of lifters which, when elevated, press the rim of the bottle mouth against my improved washer. The pressure against the washer moves a spring pressed tube section on which it is mounted away from a fixed valve normally closing the tube outlet; such tube telescoping over a second tube section in moving away from the fixed valve. The liquid running down the tube sections, either as a result of condensation of atmospheric moisture or leakage between the tube sections is collected in the channel in the top of my improved washer and discharged therefrom preferably toward the axis of rotation of the filling machine and away from the path through which the bottles are moved by the feed and delivery mechanism.

The characteristic features and advantages of my improvements will further appear from the following description and the accompanying drawing of an illustrative embodiment of my invention.

In the drawing, Fig. 1 is a fragmentary side elevation of a usual type of bottle filling machine having my improvements applied thereto; Fig. 2 is a diagrammatic illustration showing, in sectional plan view, bottle feed and delivery mechanism as well as the bottle filling machine shown in Fig. 1; Fig. 3 is a perspective view on an enlarged scale of my improved valve rubber or washer; and Fig. 4 is an enlarged vertical sectional view through a valve mechanism of the bottle filling machine and showing my improved valve rubber or washer in place.

As an illustration of the type of apparatus to which my improvements are particularly applicable, there is shown in the drawing a usual form of rotary milk bottle filling machine comprising a rotary table 1, provided with a series of vertically movable lifters 2, to which bottles may be delivered by a star wheel 3 and conveyor 4. The lifters 2 are elevated and lowered by lever mechanisms 5 operated in timed relation with the rotation of the table 1. A supply tank 6, supported and revolved by a shaft 7 in synchronism with the movement of the table 1, has, depending from the bottom thereof, a series of tubes 8, aligned with the centres of the lifters 2. Spouts or filler tubes 9 are sleeved on and make a close slip fit with the tubes 8; the spouts being normally pressed downward by coiled springs 10. The rims of the outlet ports of the tube sections 9 bear against the top faces of stationary valves 11 supported by spiders 12 in the tank. Elastic disks or washers 13, sleeved on the spouts or collars 9, bear against the beads 9' thereof and have bottom faces 16 adapted to receive the thrust of the mouth rims of bottles when the latter are elevated by the action of the mechanisms 5 on the lifters 2.

The thrusts against the washers 13 are transmitted to and move the spouts 9 away from the valves 11 to permit flow through the tube sections 8 and 9, over the valves 11, and down the sides of the bottles.

In accordance with my invention, each washer 13 has its upper face so moulded as to form a groove or channel 14 surrounding the spout 9 adjacent to the outlet thereof. Moisture condensing on the tank 6 or tube sections 8 and 9, or leakage exuding between the sections 8 and 9, and running down the exterior surface of a spout section 9, is collected in a channel 14 and discharged therefrom through an orifice or spout 15. The efflux from the orifice 15 is directed, preferably, in the general direction of the center of the machine so as to clear the zones through which bottles are moved by the star wheels 3 and 17 in passing to and from lifters 2. Consequently there is no danger of contaminating the contents of the bottles by drippings. The filled bottles pass down the chute 18 to a conveyor 19.

Having described my invention, I claim:

1. A bottle filling machine comprising a reservoir having filling tubes depending therefrom, means for moving a bottle to filling position under the mouth of a filling tube and for withdrawing a filled bottle from such position, and a bottle-closure surrounding, and detachably secured to, the bottom of said filling tube immediately adjacent to the mouth thereof, said closure having an external condensate and leakage collecting channel annularly disposed in the upper surface thereof and having a port directed away from the path of movement of a bottle passing under or from the mouth of said filling tube and discharging at a position substantially offset from said path.

2. A bottle filling machine comprising a reservoir having telescoped filling tubes depending therefrom, the lower of said tubes having a bead below the top portion thereof, a spring engaging said bead and tending to press said lower tube downwardly, a valve against which said tube is pressed by said spring, and a non-metallic yieldable bottle-closure surrounding the bottom of said filling tube immediately adjacent to the mouth thereof and below said bead, said closure having an annular channel in the upper surface thereof for collecting condensate and leakage below the bottom of said spring and a port discharging said collected condensate and leakage away from said bottle closure.

3. In a bottle filling machine, the combination with a filling tube of a bottle closure comprising a washer detachably mounted on said filling tube and composed of elastic material having an axial aperture for the passage of the filling tube, the lower face of said washer having therein an annular groove for receiving a bottle mouth, the upper face of said washer having therein an annular channel with walls extending upwardly along both sides of said channel, and the periphery of said washer having thereon a spout communicating with the channel in the upper face of the washer and projecting beyond a bottle mouth seated in the groove in the lower face of the washer.

4. In a bottle-filling machine, the combination with an upright feed tube, a support for positioning a bottle under the tube, and means providing upright relative movement between the tube and the support, of a member surrounding, and closely fitting the tube detachably secured thereto having an inverted underside dome for centering projection into a bottle, a perimetral bead outside, and having a portion below the bottle top, a groove portion fitting the bottle top between the dome and the bead, a top-side channel portion embracing the tube and a channel drain spout projecting radially outwardly beyond the bead.

5. In a bottle-filling machine, the combination with an upright feed tube, a support for positioning a bottle under the tube, and means providing upright relative movement between the tube and the support, of a one-piece elastic member surrounding and closely fitting the tube detachably secured thereto having an underside annular portion fitting a bottle mouth, an upperside channel portion embracing the tube and a radial channel drain spout.

6. In a bottle-filling machine, the combination with an upright feed tube, a support for positioning a bottle under the tube, and means providing upright relative movement between the tube and the support, of a one-piece elastic member surrounding and closely fitting the tube detachably secured thereto, having an inverted underside dome for centering projection into a bottle, a perimetral bead outside, and having a portion below the bottle top, a groove portion fitting the bottle top between the dome and the bead, a top-side channel portion embracing the tube and a channel drain spout projecting radially outwardly beyond the bead.

7. A bottle-top member comprising one piece of yieldable material of disc-like character including an axially thick, axially-apertured central body surrounded by an axially thinner flange-like perimetral portion providing an underside annular groove fitting the bottle top and a top-side channel embracing the aperture, and having a channel drain spout projecting radially outwardly from the flange.

EDWARD B. LUCKIE.